(12) United States Patent
Gonzalez et al.

(10) Patent No.: US 12,723,566 B2
(45) Date of Patent: Sep. 1, 2026

(54) CONTROLLING A WIND TURBINE REGARDING NOISE EMISSION

(71) Applicant: Siemens Gamesa Renewable Energy Innovation & Technology S.L., Sarriguren (ES)

(72) Inventors: Pablo Aller Gonzalez, Madrid (ES); Tomas Rosenberg Hansen, Horsens (DK); Marcel thor Straten, Haby (DE)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 258 days.

(21) Appl. No.: 18/286,777

(22) PCT Filed: Apr. 4, 2022

(86) PCT No.: PCT/EP2022/058827

§ 371 (c)(1),
(2) Date: Oct. 13, 2023

(87) PCT Pub. No.: WO2022/223266

PCT Pub. Date: Oct. 27, 2022

(65) Prior Publication Data

US 2024/0191689 A1 Jun. 13, 2024

(30) Foreign Application Priority Data

Apr. 23, 2021 (EP) .................................... 21382353

(51) Int. Cl.

*F03D 7/02* (2006.01)
*F03D 7/04* (2006.01)
*F03D 17/00* (2016.01)

(52) U.S. Cl.

CPC ........... *F03D 7/0296* (2013.01); *F03D 7/046* (2013.01); *F03D 17/015* (2023.08); *F05B 2270/333* (2013.01)

(58) Field of Classification Search

CPC ...... F03D 7/0296; F03D 7/046; F03D 17/015; F03D 80/003; F05B 2270/333; Y02E 10/72

See application file for complete search history.

(56) References Cited

U.S. PATENT DOCUMENTS

2007/0031237 A1* 2/2007 Bonnet .................. F03D 7/048 415/1
2011/0175356 A1* 7/2011 Nielsen ................ F03D 7/0296 290/44

(Continued)

FOREIGN PATENT DOCUMENTS

EP 3 067 555 A1 9/2016
WO 2018/113871 A1 6/2018

OTHER PUBLICATIONS

International Search Report and Written Opinion for PCT/EP2022/058827, mailed on Jul. 14, 2022.

(Continued)

*Primary Examiner* — Christopher E. Everett
(74) *Attorney, Agent, or Firm* — Schmeiser Olsen PLLC

(57) ABSTRACT

A method of controlling a wind turbine having a rotor, in particular in all rotational speed regimes is provided, the method including: determining a rotor noise contribution, in particular based on an actual rotor operational state; determining auxiliary noise contributions from plural auxiliary components based on respective actual operational states; determining a total noise based on the auxiliary noise contributions and the rotor noise contribution; comparing the total noise with a noise threshold; adapting a limit value of at least one operational parameter and/or a respective (Continued)

Figure 1:
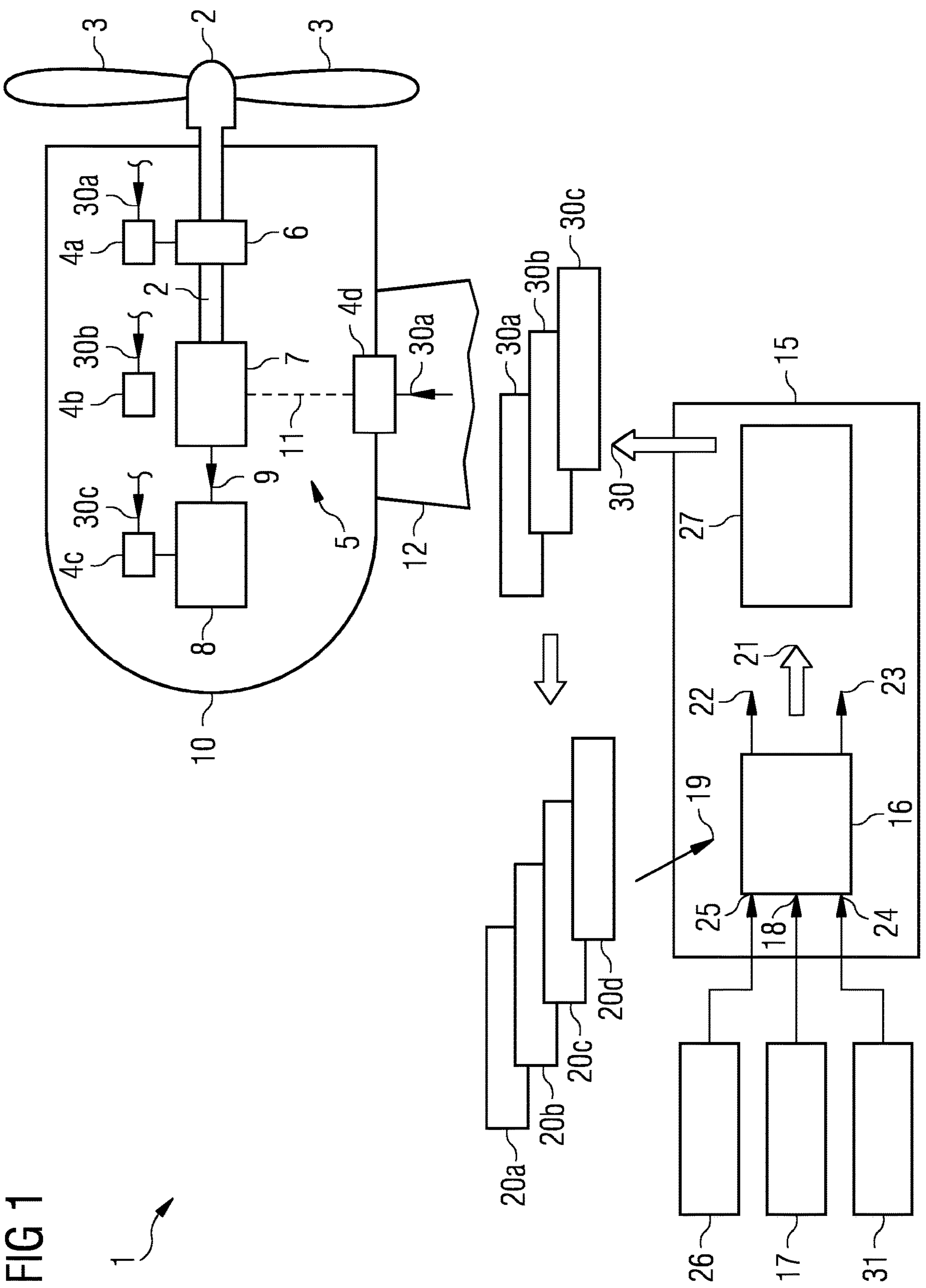

operational state of at least one of the auxiliary components depending on the comparison result.

12 Claims, 2 Drawing Sheets

(56) References Cited

U.S. PATENT DOCUMENTS

2011/0223018 A1* 9/2011 Srinivasan ............ F03D 7/0296 416/31
2013/0140818 A1* 6/2013 Matesanz Gil ......... F03D 7/048 290/44
2016/0265511 A1* 9/2016 Petersen ................... F03D 9/25
2020/0088164 A1* 3/2020 Gupta ................... F03D 7/0224
2020/0332767 A1 10/2020 Gupta et al.

OTHER PUBLICATIONS

International Preliminary Report on Patentability for PCT/EP2022/058827 completed on Mar. 16, 2023.

* cited by examiner 1
2
3
4a
4b
4c
4d
5
6
7
8
9
10
11
12
15
16
17
18
19
20a
20b
20c
20d
21
22
23
24
25
26
27
30
30a
30b
30c
31

Sound Power [dB(A)]
Wind Speed [m/s]
Time [h]
1dB
40
41
42
43
44
45
46
47
48
49
50
51
52
53
54

CONTROLLING A WIND TURBINE REGARDING NOISE EMISSION

CROSS-REFERENCE TO RELATED APPLICATIONS

This application claims priority to PCT Application No. PCT/EP2022/058827, having a filing date of Apr. 4, 2022, which claims priority to European Application No. 21382353.7, having a filing date of Apr. 23, 2021, the entire contents both of which are hereby incorporated by reference.

FIELD OF TECHNOLOGY

The following relates to a method and to a corresponding arrangement of controlling a wind turbine having a rotor. Furthermore, the following relates to a wind turbine being adapted to carry out or control the method and which comprises the arrangement.

BACKGROUND

During operation, wind turbines produce noise emissions which may be required to satisfy legal requirements. For example, wind turbine noise emission may be limited by a legal regulation with respect to a nearest dwelling. Different components of the wind turbine may produce noise contributions. The total noise from the wind turbine may consist of noise from the rotor and/or drive train but may also comprise noise produced by auxiliary systems, like cooling system, pumps, etc. The noise as generated by the rotor or the drive train may mainly be correlated with the rotational speed of the rotor, the pitch angle of the rotor blades and power production. In order to reduce noise for specific wind turbines for site specific conditions, often the rotational speed is reduced. Some regulations demand noise limits to be substantially lower at specific situations which require the rotor to slow down considerably.

In order to meet legal regulation limits, the rotational speed of the wind turbine rotor is often reduced. Since the noise from the wind turbine is however not limited to noise as generated by the rotor, the auxiliary systems such as cooling systems, yawing systems, other auxiliary motors and mechanical drives may also considerably contribute to the total noise as emitted by the wind turbine. Even if noise from auxiliary systems may not be a major contributor at full rotational speed of the wind turbine, noise from the auxiliary systems may become more and more prominent at lower rotational speeds, i.e., when the rotor noise is reduced. Therefore, the noise from the auxiliary systems may become the limit of how much the noise can be reduced in a low rotational speed operational mode.

Conventionally, in order to meet legal requirements or limits, the noise generated by the wind turbine has been reduced at all wind speeds. In particular, the noise as generated or emitted by auxiliary systems may have been reduced at all wind speeds. However, in particular circumstances or environmental conditions, noise reductions may not be needed at all wind speeds.

Another conventional method is to reduce the operation of the auxiliary system, either by stopping or reducing the speed of the auxiliary system. By limiting the speed of one or more auxiliary systems (for example a cooling fan) the capacity of the system may be limited. This may lead to a reduction of the power output by the wind turbine.

The document WO 2018/113871 A1 discloses a method of controlling a wind turbine comprising one or more component cooling devices. Therein, the turbine operation is modified upon contribution of cooling device noise to overall turbine noise and based upon noise requirements. Furthermore, the power output may be increased, the rotor speed may be increased, the pitch angle of the blades may be varied, when the contribution of noise from one or more component cooling devices decreases. Furthermore, the power output may be decreased when noise from the one or more cooling devices increases.

The document EP 3067555 A1 discloses to adjust the speed of the cooling fan in response to reduction of rotor speed. In particular, a simple static way is disclosed to solve the problem and to ensure the noise limitations are fulfilled at low noise operation modes.

However, using a static controller with fan speed limits fixed to modes or rotor speed does not necessarily ensure proper cooling of the system. If more cooling is needed in one system, for some reason, it may not be possible due to the fixed rotational limit. Therefore, the turbine might derate or stop due to the high temperature in one or more sub-system (for example the gear oil or generator) even though another fan is not running full speed and noise limit is therefore not reached.

Thus, there may be a need to a method and a corresponding arrangement of controlling a wind turbine wherein in particular noise limits are met while the operation of the wind turbine may be improved. Furthermore, it may be desired a method and arrangement, wherein noise limits of wind turbines are met, the power output is improved, or load of components is reduced and performance of the wind turbine and/or the auxiliary systems is improved.

SUMMARY

An aspect relates to a method of controlling a wind turbine having a rotor, in particular in a low rotational speed regime, the method comprising: determining a rotor noise contribution, in particular based on an actual rotor operational state: determining auxiliary noise contributions from plural auxiliary components based on respective actual operational states: determining a total noise based on the auxiliary noise contributions and the rotor noise contribution: comparing the total noise with a noise threshold: adapting a limit value of at least one operational parameter and/or a respective operational state of at least one of the auxiliary components depending on the comparison result.

In embodiments, the method may be implemented in software and/or hardware. In embodiments, the method may for example be performed by a wind turbine controller or a module of a wind turbine controller or a wind park controller. In embodiments, the method may be performed during operation of the wind turbine, for example during normal operation at a nominal rotational speed or at a rotational speed which is reduced with respect to the nominal rotational speed. In embodiments, the method may in particular be performed in a low rotational speed regime, wherein the rotational speed is less than the nominal or rated rotational speed, for example in a range of for example 30% to 90% or 40% to 80% of the nominal rotational speed.

The rotor noise contribution may relate to any noise emissions as generated by components of the main rotor at which the rotor blades are mounted which may be mechanically connected to an optional gearbox and an optional secondary rotor which may drive the generator. The rotor noise contribution may include also generator noise, a drive train noise, gearbox noise, bearing noise, rotor blade noise for example. The rotor noise contribution may be determined by utilizing a mathematical physical model wherein operational parameters like rotational speed are input variables and the noise contribution may be derived in dependence in the one or more operational parameters relating to rotor operation.

Also, for possibly each of the plural auxiliary components, a physical/mathematical model (for example a lookup table and/or a mathematical equation) may be predetermined and may be utilized to determine the auxiliary noise contributions. Each of the plural auxiliary components may be characterized regarding its operation with specific operation parameters and their values. Those may be taken into account to determine the auxiliary noise contributions.

The total noise may be determined by combining the noise contributions from the different noise sources, i.e., the rotor system and the auxiliary components. The total noise and/or the respective noise contributions may for example be determined in decibel (dB).

The noise threshold may relate to a noise limit as set for example by a legal regulation or a set point as provided for example by a wind farm operator. In order to meet the legal regulation, the total noise as determined may be required to be not exceeding the noise threshold.

Each of the auxiliary components may be characterized regarding its operational state by one or more values of at least one operational parameter. Either the limit value of at least one operational parameter and/or the at least one operational parameter (value) itself may be adapted (thereby adapting the respective operational state of the at least one auxiliary component) depending or based on the comparison result. The comparison result may indicate whether the total noise is greater than, equal to or lower than the noise threshold.

Adapting either the limit value of the operational parameter and/or the operational parameter value itself, may be in the direction in order to result in the total noise being smaller or equal to the noise threshold. In particular, if the total noise is lower than the noise threshold, one or more of the auxiliary components may be adapted in their respective operation state, such as to improve or enhance performance, efficiency and/or capacity or capability, in particular regarding for example cooling capacity. Thereby, other components affected by those auxiliary components may be set in a state which lowers wear, or which reduces damage and/or improves performance.

In embodiments, the method may be performed not only at a low rotational speed regime but in any speed regime(s).

Any number of auxiliary systems may be supported or present, such as between two and ten or between two and 100, e.g.

According to embodiments of the present invention, a remaining capacity for noise (for example as determined by considering the difference between the noise threshold and the total noise) may be used to provide activity (for example cooling, yaw activity, etc.) for another auxiliary system to operate or to operate at higher speed and/or capacity and/or efficiency and/or performance. Thereby, overall operation of the wind turbine may be improved, in particular regarding power production efficiency or capability.

In embodiments, the method may be implemented or may be carried out by an active controller or control module. When the limit value or the value of the at least one operational parameter of at least one of the auxiliary components is adapted depending on the comparison result, the performance of the wind turbine may be improved.

According to an embodiment of the present invention, adapting the respective operational state of at least one of the auxiliary components further depends on at least one operational parameter or state parameter, in particular temperature, of a wind turbine component which the auxiliary component, in particular cooling component, is designed to affect.

For example, a cooling system, may be configured to cool a wind turbine component, for example a bearing system, a gearing system, a generator, etc. The component, which is cooled by the auxiliary component, may be required to operate below a particular temperature threshold. For example, the cooling system, i.e., one of the auxiliary components, may be configured to keep the temperature of the wind turbine component, which is cooled, below the respective temperature limit or temperature threshold. When for example the temperature of the wind turbine component to be cooled rises above or approaches closely to the respective temperature limits, the auxiliary component, i.e., the cooling component, may be adapted to run at a higher performance or capacity, in particular cooling capacity, if it is determined that the total noise is for example lower than the noise threshold. In another situation, when the temperature of the wind turbine component to be cooled by a first auxiliary component, is well below the respective temperature threshold, the respective first auxiliary component may not be increased regarding capacity or efficiency. However, a potentially second auxiliary component, which is designed to cool another wind turbine component may be increased regarding its performance, in order to for example cool the second wind turbine component to be cooled which temperature may be above or may be approaching closely to the respective temperature limit.

In particular, state parameters of several wind turbine components which may require cooling, may be considered to decide which one of potentially plural auxiliary components needs to be operated at higher efficiency or capacity and which of the auxiliary components may potentially be required or needed to be operated at lower capacity of performance for example. Thus, noise emissions emitted by the different auxiliary components may be traded against each other such that the total noise stays below the noise threshold and also the wind turbine components to be cooled are kept below the respective temperature thresholds.

According to an embodiment of the present invention, the auxiliary components require electrical energy for operation and/or include at least one of: a cooling fan, in particular for cooling a generator and/or a converter and/or a gear box and/or a bearing: at least one pump, in particular for pumping gear oil and or hydraulic oil: a compressor, in particular for compressing oil: a yawing system.

Thus, the auxiliary component may be an electric or an electronic component. By supplying more electrical energy to the respective auxiliary component, the respective auxiliary component may be operated at a higher capacity, capability or efficiency. Thereby, fast adaptation of the respective auxiliary component may be enabled. The auxiliary component may in particular comprise one or more cooling components. The cooling component may be adapted or designed as a cooling fan, a cooling system conveying a cooling fluid, including a compressor and/or a pump.

The auxiliary system not necessarily is or comprises a cooling component or cooling system. The operational capacity of efficiency of the wind turbine may also be improved by for example operating a yawing system (e.g., at higher turning speed) in order to appropriately yaw the wind turbine in the respective wind direction. Thereby, plural different auxiliary components may be supported, thereby increasing flexibility of the method.

According to an embodiment of the present invention, adapting the respective operational state of at least one of the auxiliary components comprises at least one of: increasing or decreasing energy supply to the component, thereby increasing or decreasing capacity and/or performance and/or efficiency of the component: increasing or decreasing rotational speed of the component:

turning on or off at least one of the auxiliary components that have previously been turned off or on, respectively.

Thereby, a number of possible adaptation measures is supported. In particular, the cooling capacity may be increased or decreased.

According to an embodiment of the present invention, if less performance of a first auxiliary component is sufficient and/or demanded, the method comprises: decreasing energy supply to the first auxiliary component, thereby decreasing capacity and/or performance and/or efficiency and/or noise of the first auxiliary component: increasing energy supply to a second auxiliary component, thereby increasing capacity and/or performance and/or efficiency and/or noise of the first auxiliary component.

For example, operation of a first auxiliary component may be changed or adapted in concert or in a combination with an adaptation of a second auxiliary component, such that the total noise is below the noise threshold and furthermore that one or more wind turbine components affected by the operation of the first auxiliary component are improved regarding their operation and also wind turbine components affected by the second auxiliary component are improved in their operation or at least not decreased in their performance. In particular, the energy supplied to the first auxiliary component may be decreased under the condition that any wind turbine components as affected by the operation of the first auxiliary component does not raise its temperature above a respective temperature threshold. Further, the energy supply increase to the second auxiliary component may be performed, when for example any wind turbine component affected by the second auxiliary component operation requires for example more cooling.

In other embodiments any wind turbine component may be affected in another manner by the operation of the respective auxiliary component. For example, operation of the rotor, may be affected by the yaw angle as set by the yawing system. Thereby, for example efficiency of the rotor may be improved, while further also potentially decreasing noise emissions, at least after the new yawing angle has been set.

According to an embodiment of the present invention, the at least one operational parameter of the at least one of the auxiliary components for which the limit value is adapted includes at least one of: a noise level emitted by the component: a rotational speed of the component, in particular of a fan and/or a pump and/or a yawing system: a pressure of the component, in particular generated by a pump and/or a compressor: a torque of the component, in particular of a fan and/or a pump and/or a yawing system.

The above listed operational parameters may be individually or in any combination define the operational state of the respective auxiliary component. The value and/or the limit of the respective operational parameter may be adapted based on the comparison result. For example, the noise level limit of noise emitted by the component may be adapted depending on the comparison result. The noise level limit may in turn be translated or translatable into one or more limits of one or more operational parameters, since the emitted noise may depend on the values of the one or more operational parameters. Thereby, great flexibility is provided for defining the kind of adaptation or the kind of the limit value which is adapted depending on the comparison result comparing the total noise with the noise threshold.

Furthermore, rotational speed and/or pressure and/or torque may be translated or translatable to the respective emitted noise level. For example, a multidimensional lookup table may be provided in order to translate one or more values of the one or more operational parameters to a respective auxiliary component noise contribution. Thereby flexibility of the method may be moved.

According to an embodiment of the present invention, the method further comprises obtaining meteorological condition information: wherein determining auxiliary noise contributions and/or rotor noise contribution is further based on the meteorological condition information: and/or wherein obtaining meteorological condition information comprises measuring and/or estimating the meteorological condition information: and/or wherein the meteorological condition information comprises information regarding at least one of: a wind speed: a wind direction: a wind turbulence: an air density.

For example, the air density may also influence the noise emitted by the wind turbine and/or the wind rotor and/or the auxiliary components. Further, wind turbulence may affect the noise emission or influence the noise emission. Thereby, the determination of the respective noise contributions may be improved. Thus, for example, the respective noise contribution may be determined using for example a multidimensional lookup table in which one or more values of operational state and also one or more values of the meteorological condition is used as input values.

According to an embodiment of the present invention, if the at least one of the auxiliary components is operated at the adapted limit value of the at least one operational parameter, the total noise is not above the noise threshold: and/or wherein, if the total noise is smaller than the noise threshold, the adapted limit value and/or the operational parameter is set to be greater than a previous value: and/or wherein, if the total noise is greater than the noise threshold, the adapted limit value and/or the operational parameter is set to be smaller than a previous value.

Thereby, the legal regulations may be met and/or performance of one or more wind turbine components may be improved and/or also a counter-measure may be taken in order to correct the operation, when the total noise is approaching closely or is even greater than the noise threshold.

According to an embodiment of the present invention, wherein the rotor noise contribution comprises drive train noise and/or gear box noise and/or bearing noise and/or mechanical noise of main components of the rotor: and/or wherein the rotor operational state includes definition of at least one operational parameter of the rotor including at least one of: a rotational speed: a rotor power: a turbine output power: a rotor torque: a rotor position: at least one rotor blade pitch angle: a yaw angle: a yaw angle error: a rotational acceleration.

The drive train noise may for example comprise noise generated by one or more bearings rotationally supporting the rotor. The rotor operational state may be held constant, such as to satisfy a power reference value and/or to operate at a working point of highest efficiency.

In other embodiments, the rotor may be operated according to a low rotational mode. In the low rotational mode, other wind turbine components than components as operated under nominal condition, may require more cooling or less cooling than in the respective nominal operational state. The different cooling requirements at the different working points or operational states of the rotor may be taken into account or considered for deciding how to operate the respective different auxiliary systems, in order to meet respective temperature limits and also noise thresholds or limits.

According to an embodiment of the present invention, the noise threshold is wind speed specific and/or wind direction specific and/or daytime specific.

For example, the noise threshold may be higher for a higher wind speed than for a lower wind speed. Further the noise threshold may be higher for a first wind direction than for a second wind direction. Thereby, for example a neighbouring dwelling or city may be prohibited from extensive noise.

According to an embodiment of the present invention, determining auxiliary noise contributions and/or rotor noise contribution is based on evaluation of training data and/or a physical model and/or a look-up table using as input at least one operational parameter of the respective component.

For example, each of the auxiliary systems may be examined separately, i.e., not in combination with other wind turbine components, to for example record emitted noise, for example measured by a microphone, depending on one or more values of one or more operational parameters. In a similar manner the rotor noise contribution may be determined based on such training data or calibration data. Thereby, conventionally applied techniques may be applied.

It should be understood that features, individually or in any combination, disclosed, provided or explained with respect to a method of controlling a wind turbine, may, individually or in any combination, also be applied or provided for an arrangement for controlling a wind turbine according to an embodiment of the present invention and vice versa.

According to an embodiment of the present invention, it is provided an arrangement for controlling a wind turbine having a rotor, in particular in a low rotational speed regime (and/or any other rotational speed regime), the arrangement comprising a processor adapted: to determine a rotor noise contribution, in particular based on an actual rotor operational state: to determine auxiliary noise contributions from plural auxiliary components based on respective actual operational states: to determine a total noise based on the auxiliary noise contributions and the rotor noise contribution: to compare the total noise with a noise threshold: to generate a control signal for adapting a limit value of at least one operational parameter and/or a respective operational state of at least one of the auxiliary components depending on the comparison result, the arrangement in particular being adapted to control or carry out a method according to one of the preceding embodiments.

The arrangement may for example be a portion or a module (for example software and/or hardware) of a wind turbine controller. The arrangement may also comprise an electronic storage, in which a computer program product (non-transitory computer readable storage medium having instructions, which when executed by a processor, perform actions) may be stored, and which may be loaded into the processor RAM for execution.

The control signal generated by the processor may be supplied for example to a respective driver circuitry which may be coupled to the respective auxiliary component. The driver may in turn generate a driver signal to the auxiliary component in order to adapt the respective operational state and/or to supply an adapted limit of one or more operational states or operational parameters to the auxiliary component.

The auxiliary component itself may comprise control circuitry which may respect the value of the operational parameter, or the limit value of the operational parameter as received from the driver or the processor itself. The respective auxiliary component controller may also consider one or more temperature values of one or more wind turbine components to be cooled.

According to an embodiment of the present invention, it is provided a wind turbine, comprising a rotor: plural auxiliary components; and an arrangement according to one of the preceding embodiments coupled to control the auxiliary components.

BRIEF DESCRIPTION

Figure 2:
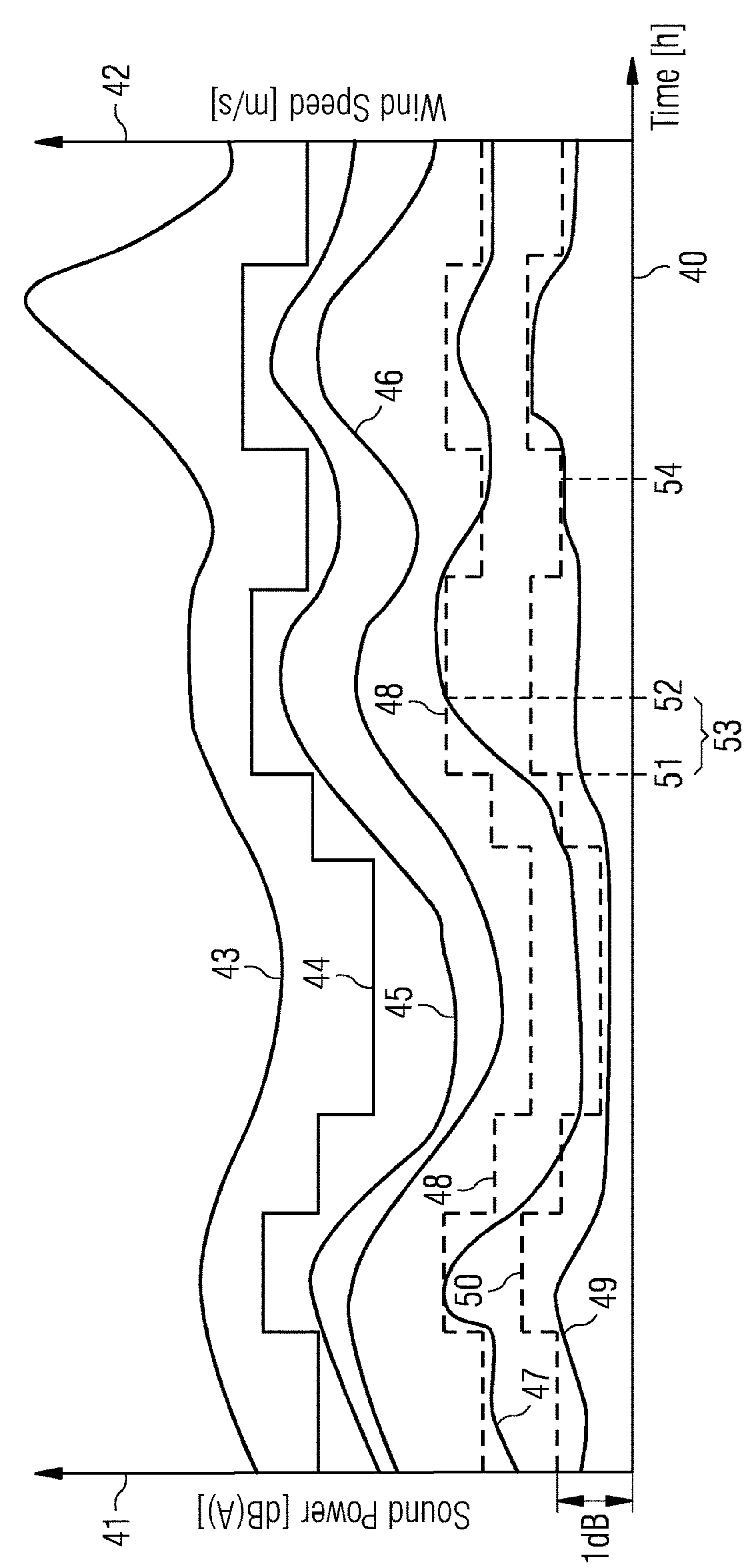

Some of the embodiments will be described in detail, with reference to the following figures, wherein like designations denote like members, wherein:

FIG. 1 schematically illustrates a wind turbine according to an embodiment of the present invention including an arrangement according to an embodiment of the present invention; and FIG. 2 illustrates noise related curves for explaining a method according to embodiments of the present invention.

DETAILED DESCRIPTION

The wind turbine 1 schematically illustrated in FIG. 1 comprises a rotor 2 at which plural rotor blades 3 are connected. The wind turbine 1 comprises plural auxiliary components 4*a*, 4*b*, 4*c*, 4*d* which are different from a general drive train 5 and which support operation of different wind turbine components. The drive train 5 comprises the rotor 2, a bearing system 6 (from which only one portion is shown, while the rotor 2 may be supported by one or several of those portions), a generator 7, and a converter 8. The drive train 5 may comprise more or less components than illustrated in FIG. 1.

The bearing system 6 or portion of a bearing system 6 rotationally supports the rotor 2, which is driven by wind impacting on the rotor blades 3. The rotor 2 or a secondary rotor which may be coupled to an optional gearbox to the primary rotor 2, drives a generator 7.

The generator 7 may for example comprise or be a permanent magnet synchronous machine or a doubly-fed induction generator for example. Other types are possible. The generator 7 generates, upon rotation of the rotor 2, AC power 9, for example three-phase AC power 9, which is supplied to the converter 8. The converter 8 converts the variable frequency AC power 9 to a considerably fixed frequency (for example 50 Hz or 60 Hz) AC power which may be supplied to a not illustrated utility grid.

In the embodiment illustrated in FIG. 1, the auxiliary components 4*a*, 4*b*, 4*c* are respective cooling components or cooling systems, which are adapted to cool one or more wind turbine components. In particular, the cooling component 4*a* is configured to cool the bearing portion 6, the cooling component 4*b* is configured and connected in order to cool the generator 7, for example to cool a stator portion and a rotor portion. The cooling component 4*c* is configured and coupled in order to cool the converter 8.

According to other embodiments, more or less cooling systems may be provided to cool components of the wind turbine. Thus, the bearing 6 is affected by the operation of the cooling system or cooling component 4*a*. The generator 7 is affected by the operation of the cooling component 4*b* and the converter 8 is affected by the cooling activity or operation of the cooling component 4*c*.

The auxiliary system 4*d* comprises or is a yawing system, adapted to turn or rotate the nacelle 10 around a substantially vertical rotation axis 11 with respect to a wind turbine tower 12.

The wind turbine 1 further comprises an arrangement 15 for controlling the wind turbine 1. The arrangement 15 may be harboured within the nacelle 10, together for example with the drive train components of the drive train 5 also together with the auxiliary systems 4*a*, 4*b*, 4*c*. The arrangement 15 comprises a processor 16 which is adapted to essentially perform or control or carry out a method of controlling the wind turbine according to an embodiment of the present invention. From a rotor state or observer module 17 the arrangement 15 receives an actual rotor operational state 18. From the actual rotor operational state 18 the processor 16 determines a rotor noise contribution 22.

The processor 16 further receives actual operational states 19 of plural auxiliary components, such as auxiliary components 4*a*, 4*b*, 4*c*, 4*d* illustrated in FIG. 1. The respective auxiliary component operational states are received from respective auxiliary system or auxiliary component operational state modules or monitoring modules 20*a*, 20*b*, 20*c*, 20*d*. The processor 16 calculates a total noise 21 based on the auxiliary noise contributions 23 and the rotor noise contribution 22.

In particular, based on the actual operational states 19 of the plural auxiliary components, the processor 16 determines the respective auxiliary noise contribution 23 of each of the auxiliary systems, such as auxiliary systems 4*a*, 4*b*, 4*c*, 4*d*. By combining the rotor noise contribution 22 and the auxiliary noise contributions 23, the total noise 21 is determined by appropriate summation.

The processor 16 further receives from a further external component or from a wind turbine controller 31 or external input 31, a noise threshold 24, which may for example be set according to a legal regulation. Furthermore, the wind turbine or the arrangement 15 or the processor 16 receives a meteorological condition 25, for example from a weather station 26 or a measurement sensor which may installed for example at the wind turbine nacelle 10.

In a module 27 of the arrangement 15, the total noise 21 is compared with the noise threshold 24. Based on the comparison result, a limit value (or plural limit values) 30 or an actual value of at least one operational parameter of at least one of the auxiliary components is determined or adapted. The respective limit value or value 30 of the respective operational parameters of the auxiliary systems, is supplied to the auxiliary systems for example 4*a*, 4*b*, 4*c*, 4*d*, and are individually labelled with reference signs 30*a*, 30*b*, 30*c*, . . . . Thus, the limit values or the values of the respective operational parameters may be communicated from the arrangement 15 to the respective auxiliary components 4*a*, 4*b*, 4*c*, 4*d*.

Thereupon, the auxiliary components may adapt their operational state. The adaptation of the operational state of the auxiliary systems may further depend on for example one state parameter, for example temperature of those wind turbine components which are affected by the respective auxiliary components. For example, the temperatures of the bearing system 6, the generator 7 and the converter 8 may be considered for adapting the respective operational state of the cooling systems 4*a*, 4*b*, 4*c*, respectively. The auxiliary systems 4*a*, 4*b*, 4*c* may for example be configured as a cooling fan and/or as a cooling system using a cooling liquid for cooling the components. For example, cooling liquid may be conveyed using a compressor or a pump to the respective component to be cooled.

The processor 16 or the arrangement 15 may also be considered as an active controller. Active controller 15 or 16 may obtain a feedback signal, such as signal 19, from the different auxiliary systems (for example auxiliary systems 4*a*, 4*b*, 4*c*) and the wind turbine rotor 2, containing information regarding the operational status or the correlation of the status to the noise (including but not limited to speed, torque, position). Based on the operational status of the auxiliary components and rotor, the controller 16, 15 may calculate the total noise 21 of the turbine including the auxiliary systems and the rotor noise and calculate the total noise 21. Information 25 of meteorological conditions may be measured and may contain, but not limited to wind speed, wind direction and other conditions. The total noise level 21 as determined by the controller 16 or processor 16 may then be compared with the given noise limit 24 at the actual wind speed.

Based on the calculation limits for the auxiliary systems (for example limits 30) may be increased (or decreased) to improve cooling (or decrease a cooling if not necessary) or other auxiliary system performance.

Thus, according to the operation of the arrangement 15 or the processor 16, the following steps are performed according to embodiments of the present invention, to which embodiments of the invention is however not restricted:

(1) The wind speed is determined by measurement of wind speed or based on turbine operation parameters.

(2) The noise contribution from auxiliary sources is calculated based on information of operational status of sources (such as but not limited to speed, pressure, torque, etc.).

(3) The sum of the noise caused by the auxiliary sources is calculated (as for example resulting in the value 23.

The noise contribution (for example 22) from the rotor or as generated by the drive train 5 is calculated based on the operational or the actual operation such as but not limited to speed, power, pitch angles, rotor position, yaw error, etc.

The total noise (for example 21 in FIG. 1) is calculated relating to the entire wind turbine (for example as sum of the rotor noise, the mechanical noise related to the main components and the noise from the auxiliary sources).

Total noise (for example 21 in FIG. 1) is compared to the noise limit 24 given for the actual wind speed.

The maximum limit (for example relating to speed, pressure, torque, etc.) of the auxiliary component (for example components 4*a*, 4*b*, 4*c*, 4*d*) is changed or adapted in order to keep the total noise limit at the given wind speed.

In particular, when performing the method, the turbine operation relating to the operational state of the rotor or the entire drive train 5 may not be modified but the potential unused noise capacity for other auxiliary systems may be utilized in order to improve the performance of the system (consisting of but not limited to change limits for speed of a cooling fan, higher pressure in a pump, higher torque, etc.).

FIG. 2 illustrates curves in a coordinate system having as an abscissa 40 the time and having as a first ordinate 41 the source power and having as a second ordinate 42 the wind speed. The curve 43 indicates the wind speed in dependence of time. It can be appreciated that the wind speed changes with time. The curve 44 indicates a maximum allowed turbine noise, which may for example correspond to the noise threshold 24 illustrated in FIG. 1. It can be seen that the noise threshold 44 changes with changing wind speed 43. In particular, for increased wind speed the noise threshold 44 is also increased. The noise threshold may be increased in a stepwise manner for example in particular wind speed thresholds are reached or exceeded.

The curve 45 indicates the total noise of the wind turbine, for example corresponding to the total noise 21 illustrated in FIG. 1. Curve 46 indicates the rotor noise contribution, for example corresponding to the rotor noise 22 illustrated in FIG. 1.

The curve 47 indicates the noise contribution of a first auxiliary system. The curve 48 indicates the noise limit for the first auxiliary system. The curve 49 indicates the emitted noise by a second auxiliary system. The curve 50 indicates the noise limit for the second auxiliary system.

The noise limit 48 for the first auxiliary component and the noise limit 50 for the second auxiliary component may for example be calculated by the arrangement 15 illustrated in FIG. 1, and may for example correspond to the limit values 30. Thereby, the curves 48, 50 seem to vary with time. In particular, they change in correlation to the wind speed dependent noise threshold 44. In other embodiments, the noise limit values 48, 50 do not necessarily vary in correlation with the change of the total noise threshold 44.

It can be appreciated from curves 44 and 45, that the total noise 45 of the wind turbine consistently stays below the total noise threshold 44.

At a point in time 51 it is observed that the actual noise emission 47 of the first auxiliary system stays or is below the noise threshold 48 of the first auxiliary system. In particular, the noise emitted by the first auxiliary system stays below the threshold 48 of the first auxiliary system in a time interval 53 ranging from the point in time 51 to the point in time 52. In the corresponding time interval 53, the second auxiliary system therefore may produce more noise. This can for example be seen at the point in time 54. In the time interval 53 the noise (in particular of the second auxiliary system) is lower (in particular than its limit 50), therefore the noise emission 47 of the first auxiliary system is allowed to increase the noise (above the former limit 48) when needed at the point of time 52). At the point in time 54 or a particular time interval, the first auxiliary system is again reduced to the original limit, since the second auxiliary system increases noise. When for example the second auxiliary system is producing more noise, it may be due to the increased capacity or efficiency, for example for more efficiently cooling more wind turbine components which need increased cooling.

While performing the method, the operation of the rotor or the entire drive train may be kept essentially constant for providing desired power production.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine having a rotor, the method comprising:

determining a rotor noise contribution based on an actual rotor operational state;

determining auxiliary noise contributions from a plurality of auxiliary components based on respective actual operational states;

determining a total noise based on the auxiliary noise contributions and the rotor noise contribution;

comparing the total noise with a noise threshold; and adapting a limit value of at least one operational parameter and/or a respective operational state of at least one of the plurality of auxiliary components depending on the comparing, wherein, when less performance of a first auxiliary component is sufficient and/or demanded, the method comprises:

decreasing energy supply to the first auxiliary component, thereby decreasing capacity and/or performance and/or efficiency and/or noise of the first auxiliary component; and increasing energy supply to a second auxiliary component, thereby increasing capacity and/or performance and/or efficiency and/or noise of the second auxiliary component.

2. The method according to claim 1, wherein adapting the respective operational state of at least one of the auxiliary components further depends on at least one operational parameter or state parameter, of a wind turbine component which an auxiliary component, cooling component, is designed to affect.

3. The method according to claim 1, wherein the plurality of auxiliary components require electrical energy for operation and/or include:

a cooling fan, for cooling a generator and/or a converter and/or a gear box and/or a bearing;

at least one pump, for pumping gear oil and or hydraulic oil;

a compressor, for compressing oil; or a yawing system.

4. The method according to claim 1, wherein adapting the respective operational state of at least one of the plurality of auxiliary components comprises:

increasing or decreasing energy supply to the component, thereby increasing or decreasing capacity and/or performance and/or efficiency of the component;

increasing or decreasing rotational speed of the component; or turning on or off at least one of the auxiliary components that have previously been turned off or on, respectively.

5. The method according to claim 1, wherein the at least one operational parameter of the at least one of the plurality of auxiliary components for which the limit value is configured includes:

a noise level emitted by the component;

a rotational speed of the component, of a fan and/or a pump and/or a yawing system;

a pressure of the component, generated by a pump and/or a compressor; or a torque of the component, of a fan and/or a pump and/or a yawing system.

6. The method according to claim 1, further comprising:

obtaining meteorological condition information;

wherein determining auxiliary noise contributions and/or rotor noise contribution is further based on the meteorological condition information; and/or wherein obtaining meteorological condition information comprises measuring and/or estimating the meteorological condition information; and/or wherein the meteorological condition information comprises information regarding:

a wind speed;

a wind direction;
a wind turbulence;
an air density;
air humidity;
air temperature;
stability; or
shear.

7. The method according to claim 1, wherein, if the at least one of the auxiliary components is operated at the configured limit value of the at least one operational parameter, the total noise is not above the noise threshold; and/or wherein, if the total noise is smaller than the noise threshold, the configured limit value and/or the operational parameter is set to be greater than a previous value; and/or wherein, if the total noise is greater than the noise threshold, the configured limit value and/or the operational parameter is set to be smaller than a previous value.

8. The method according to claim 1, wherein the rotor noise contribution comprises drive train noise and/or gear box noise and/or bearing noise and/or mechanical noise of main components of the rotor; and/or wherein the rotor operational state includes definition of at least one operational parameter of the rotor including:

a rotational speed;
a rotor power;
a turbine output power;
a rotor torque;
a rotor position;
at least one rotor blade pitch angle;
a yaw angle;
a yaw angle error; or
a rotational acceleration.

9. The method according to claim 1, where the noise threshold is wind speed specific and/or wind direction specific and/or daytime specific.

10. The method according to claim 1, wherein determining auxiliary noise contributions and/or rotor noise contribution is based on evaluation of training data and/or a physical model and/or a look-up table using as input at least one operational parameter of the respective component.

11. An arrangement for controlling a wind turbine having a rotor, the arrangement comprising:

a processor configured:

to determine a rotor noise contribution based on an actual rotor operational state;

to determine auxiliary noise contributions from a plurality of auxiliary components based on respective actual operational states;

to determine a total noise based on the auxiliary noise contributions and the rotor noise contribution;

to compare the total noise with a noise threshold;

to generate a control signal for adapting a limit value of at least one operational parameter and/or a respective operational state of at least one of the plurality of auxiliary components depending on a comparison result, the arrangement being configured to control or carry out a method according to claim 1.

12. A wind turbine, comprising:

a rotor;

plural auxiliary components; and an arrangement according to claim 1 coupled to control the auxiliary components.

* * * * *